US005101947A

United States Patent [19]

Braun et al.

[11] Patent Number: 5,101,947

[45] Date of Patent: Apr. 7, 1992

[54] CONNECTABLE DRIVE FOR A SCREWDRIVER SPINDLE

[75] Inventors: Andreas Braun, Wendlingen; Heinz Deuschle, Oberboihingen, both of Fed. Rep. of Germany

[73] Assignee: Metabowerke GmbH & Co., Nurtingen, Fed. Rep. of Germany

[21] Appl. No.: 504,329

[22] Filed: Apr. 4, 1990

[30] Foreign Application Priority Data

Apr. 19, 1989 [DE] Fed. Rep. of Germany ....... 3912790

[51] Int. Cl.[5] .............................................. F16D 43/20

[52] U.S. Cl. ................................. 192/56 R; 192/150; 81/474

[58] Field of Search ........................ 192/56 R, 150, 34; 173/12; 81/474

[56] References Cited

U.S. PATENT DOCUMENTS

| | | | |
|---|---|---|---|
| 3,034,623 | 5/1962 | Amtsberg | 192/56 R |
| 3,266,607 | 8/1966 | Frisbie | 192/56 R X |
| 3,398,611 | 8/1968 | Hahner | 192/56 R |
| 3,593,830 | 7/1971 | Clapp et al. | 192/56 R X |
| 3,613,751 | 10/1971 | Juhasz | 81/474 |
| 3,616,883 | 11/1971 | Sindelar | 81/474 X |
| 4,368,784 | 1/1983 | Wünsch et al. | 192/56 R X |
| 4,543,074 | 9/1985 | Ville et al. | 192/56 R X |
| 4,913,242 | 4/1990 | Lo | 192/56 R X |
| 4,951,756 | 8/1990 | Everett et al. | 192/56 R X |

FOREIGN PATENT DOCUMENTS

| | | | |
|---|---|---|---|
| 2071235 | 9/1981 | United Kingdom | 192/150 |

*Primary Examiner*—Allan D. Herrmann
*Assistant Examiner*—Andrea Pitts
*Attorney, Agent, or Firm*—Charles E. Baxley

[57] ABSTRACT

A device for driving a screwdriver spindle has a claw clutch and an over-detent clutch. The two clutches are arranged coaxially to each other and have coupling parts which are displaceable in an axial direction. Upon a first response of the over-detent clutch, the claw clutch is disengaged, a correspondingly axially displaceable coupling part of the claw clutch is then locked in a disengaged position by a disengageable safety which is simply a radially elastically expandable clamping sleeve which is connected to the claw-clutch and has a detent projection which protrudes radially inward. The screwdriver spindle on which the clamping sleeve is arranged has two circumferential grooves for engagement of the detent projection, the axial center-to-center distance of which is greater than the coupling stroke of the claw clutch.

4 Claims, 1 Drawing Sheet

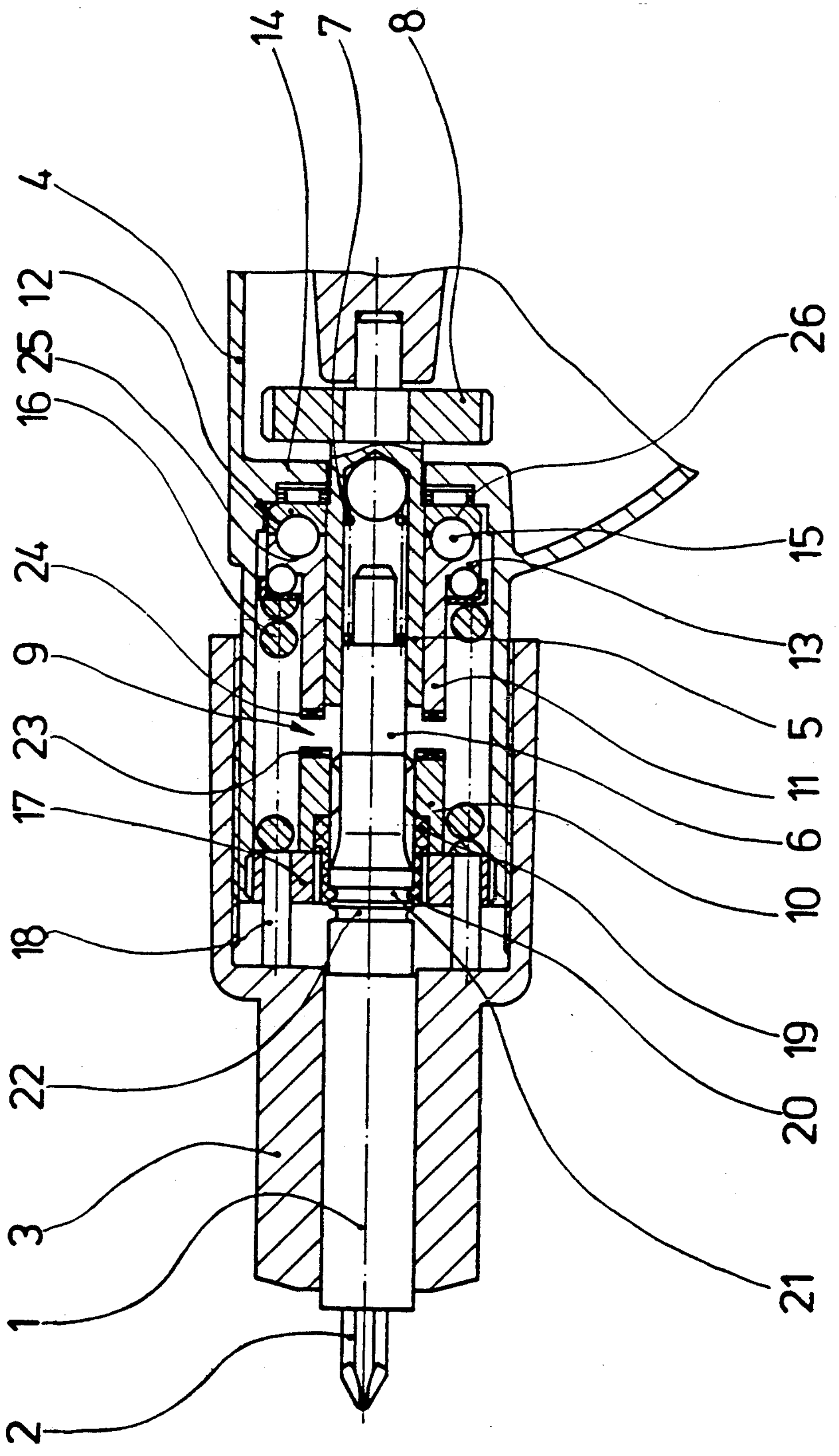
14
7
8
4
12
25
16
26
15
24
13
9
5
23
11
6
17
10
18
19
22
20
3
1
21
2

CONNECTABLE DRIVE FOR A SCREWDRIVER SPINDLE

BACKGROUND OF INVENTION

The present invention relates to a connectable drive for a screwdriver spindle.

Such drives are used in screwdrivers in which a maximum transferable limit torque is stipulated at which a claw clutch is disengaged. An over-detent clutch sees to it that claws and mating claws of the claw clutch are brought completely out of engagement as soon as a prearranged limit torque has been exceeded so that troublesome noise of an over-ratcheting claw clutch is avoided.

One drive of this type is known from Federal Republic of Germany OS 1,678,656. In that reference, a driver sleeve of a claw clutch is part of an over-detent clutch which consists of oblique claws on the driver sleeve and rollers which correspond thereto upon moving thereover by the oblique claws, the driver sleeve is displaced in axial direction, carrying along a mating part of the claw clutch. A disengageable safety consists in connection of radially displaceable balls which can be moved into an inner circumferential groove of a gear wheel and are controlled by a spring-loaded mandrel which is arranged for axial displacement in a work spindle which is developed as a hollow shaft. The drive spindle is provided with radial passage holes for passage of the balls and the axially displaceable control mandrel is provided, on its front, with a conically tapering displacement surface in order to be able to exert a radial force on the balls. The parts of said drive are difficult to manufacture and complicated to assemble and they must, if only for this reason, be fitted carefully to each other so that jamming of the disengageable safety of the clawclutch part is avoided.

SUMMARY OF INVENTION

An object of the present invention, therefore, is to simplify construction of a device for couplable drive of a srewdriver spindle of the type described and, in particular, to reduce the number of individual parts required, make the assembling of the parts easy, and thus, as a whole, reduce cost of manufacture of the drive. The foregoing object is achieved in a drive of the type by the features set forth herein.

A particular advantage of the present invention resides in the clamping sleeve being a part which is simple to manufacture and with regard to which it is merely necessary to see to sufficient permanent elasticity. Furthermore, the clamping sleeve makes it possible to dispense with expensive control mechanisms because its relative displaceability with respect to the screwdriver spindle or drive spindle can be secured in simple fashion by means of axial stops. This advantage is true, in particular, for return into the initial position, in which connection it is readily possible, particularly when a clamping sleeve is arranged on the screwdriver spindle, to utilize force of the spring acting on the screwdriver spindle for jumping the detent projection of the clamping sleeve or screwdriver spindle from one detent groove into the other.

The clamping sleeve itself can advantageously be provided, in the manner of a collet chuck, with slots which assure a sufficient widening of the clamping sleeve in a circumferential direction. The clamping sleeve can easily be produced by machining from metal or be produced as an injection-molded part of plastic. Because, as already mentioned, axial displacement of the clamping sleeve, with predetermined engagement of the detent projection into one or the other circumferential groove of the spindle in question, can be effected by stops, no further parts, and in particular no moveable parts, are necessary for the disengageable safety of the claw-clutch part in question.

Other advantageous features of the present invention will become apparent from reading a detailed description thereof and claims appended thereto.

DESCRIPTION OF DRAWING

The invention will be described in further detail below with reference to an embodiment shown in an accompanying drawing. The drawing shows a device for the connectable or disconnectable drive of a screwdriver spindle, seen in cross section.

DESCRIPTION OF PREFERRED EMBODIMENT

In detail, one can note from the drawing a screwdriver spindle 1 which has a suitable receiver for a screwdriver tool 2 on its front end. The screwdriver spindle 1 is mounted in an adjustable sleeve 3 which is seated on a housing neck 4 of a drive machine. Inner extension 6 extends into a drive spindle 5 which is developed as a hollow shaft, a compression spring 7 being arranged between a closed inner end of the drive spindle 5 and an opposite end of the extension 6 of the screwdriver spindle 1. On the drive spindle 5 there is seated a gear wheel 8 driven via a transmission from a motor, which is not shown in the drawing.

Between the screwdriver spindle 1 and the drive spindle 5 there is arranged a claw clutch 9 which comprises a driver sleeve 10, connected fixed-for-rotation with the screwdriver spindle 1. On its rear end, the driver sleeve 10 has claws 23 which can be brought into engagement with axially facing mating claws 24 which are arranged on the front end of a sleeve-shaped clutch mating piece or clutch counterpiece 11. The coupled condition of the claw clutch 9 occurs as soon as the screwdriver spindle 1 is pushed inward, after placing the screwdriver tool 2 on a screw (not shown), against the force of the spring 7, the driver sleeve 10 being moved axially toward the clutch mating piece 11.

Furthermore, the device has an over-detent clutch 12 which has two flanges 13 and 14 which are arranged adjacent each other on the drive spindle 5 and have domes 25, 26 worked on their adjacent ends. These domes are adapted, in form-locked manner, to balls 15 which, in the coupled position of the over-detent clutch 12, are enclosed within the domes 25, 26 which face each other on the flanges 13, 14. The flange 14 is arranged fixed on the drive spindle 5 both in axial direction and in direction of rotation, while the flange 13 is part of the clutch counterpiece 11 of the claw clutch 9 and is on the end lying opposite the mating claws 24. The counterpiece 11 of the claw clutch 9 and thus the flange 13 are mounted so that they are both displaceable in axial direction and freely rotatable with respect to the drive spindle 5.

The flange 13 of the over-detent clutch 12 is acted on by a pre-tensioned spring 16, the opposite end of which rests against bolts 18. The bolts 18 are mounted for axial displacement into passage holes in a bushing 17 arranged fixed in the housing 4 and their outer ends rest against an inner end wall of the adjustable sleeve 3. By turning the adjustable sleeve 3, which is thus screwed over a greater or lesser distance on the housing 4, the spring 16 can have imparted thereto a greater or lesser initial tension. In this way, there can be varied the limit torque of the over-detent clutch 12 at which the balls 25, with temporary axial displacement of the flange 13 and thus of the clutch counterpiece 11 of the claw clutch 9, jump from one dome 25, 26 to the next adjacent dome 25, 26 on the pitch circle.

The axial movement which is thereby imposed upon the clutch counterpiece 11 is participated in by the driver sleeve 10 in the coupled state of the claw clutch 9, which for this purpose is connected via a longitudinal toothing in axially displaceable fashion, but fixed for rotation, to the screwdriver spindle 1

A clamping sleeve 19 which is extendible in circumferential direction and thus extendible also in radial direction is firmly connected to the driver sleeve 10. The clamping sleeve 19 has an inner detent projection 20 in the shape of an inner bead which lies in ring form within a radial plane. The screwdriver spindle 1 has two adjacent circumferential grooves 21 and 22 which are adapted such that the inner bead 20, of the clamping sleeve be engaged therein, of the clamping sleeve 19. The center-to-center distance between the two circumferential grooves 21 and 22 of the screwdriver spindle 1 is somewhat greater than the axial stroke thereof which is required in order to bring the claws 23 and mating claws 24 of the claw clutch 9 out of engagement.

In the initial position, the inner bead 20 of the clamping sleeve 19 engages into the inner groove 21, shown to the right in the drawing, of the screwdriver spindle 1. By pushing-in the screwdriver spindle 1 via the screwdriver tool 2, the claw clutch 9 is first of all brought into engagement. If the torque transmitted via the screwdriver spindle 1 exceeds the limit moment of the over-detent clutch 12, the balls 15 of this clutch come temporarily out of engagement with the domes 25 and 26, resulting in axial displacement of the clutch counterpiece 11 in the direction toward the left. This axial stroke is participated in by the driver sleeve 10, the inner bead 20 of the clamping sleeve 19 jumping from the right-hand circumferential groove 21 into the left-hand cicumferential groove 22 of the screwdriver spindle 1. As soon as the balls 15 of the over-detent clutch 12, after a single riding-over, enter into the newly resulting pair of domes 25, 26, the clutch counterpiece 11 of the claw clutch moves back to the right under the pressure of the pre-tensioning spring 16, without the driver sleeve 10 being able to follow along in this axial movement. In this way, the claw clutch 9 is disengaged and, after initial exceeding of the torque of the over-detent clutch 12, cannot transmit any further moment of load in the same operation.

The initial condition in which an engaging of the claw clutch 9 is again possible is produced in the manner that, upon removing of the screwdriver tool 2 from the corresponding screw, the screwdriver spindle 1 travels outward as a result of the force of the compression spring 7, in which connection, shortly before reaching the outer end position, the driver sleeve 10 strikes against the bushing 17 which is seated axially fixed in the housing 4, whereupon the screwdriver spindle 1 is moved out still further toward the outside, the detent bead 20 of the clamping sleeve 19 springing back from the left-hand circumferential groove 22 of the screwdriver spindle 1 into the right-hand circumferential groove 21. The compressive force of the spring 7 must be selected sufficiently great to overcome the opposing force necessary for the widening of the clamping sleeve 19.

It will be apparent to those skilled in the tool design and use that wide deviations from the foregoing preferred embodiment are possible without departing from a main theme of invention set forth in claims which follow.

We claim:

1. An apparatus for driving screwdriver spindle (1) having a claw clutch (9) and an over-detent clutch (12), in which the claw clutch (9) has a driver sleeve (10) with terminal claws (23) conjoined for rotation with the screwdriver spindle (1) and axially displaceable therewith against force of a spring (7) arranged coaxially therewith, an axially displaceable counterpiece (11) with mating claws (24) adapted to be connected to a drive spindle (5), the over-detent clutch (12) having detent members (13, 14) connected in force-locked manner with each other under pressure of a pre-tensioned spring (16), the detent member upon exceeding a maximum moment are moveable axially apart and together again, the counterpiece (11) being remote from the over-detent clutch (12) and blocked by a disengageable safety characterized by a radially resiliently extendible clamping sleeve (19) which is connected to the driver sleeve (10) and at least one radially inwardly protruding detent projection (20) arranged on the clamping sleeve (19), the screwdriver spindle (1) having, on its inside two circumferential grooves (21, 22) for engagement therein of the detent projection (20), an axial center-to-center distance of said grooves being greater than a coupling stroke of the terminal claws (23) and the mating claws (24).

2. A device according to claim 1 characterized further by the counterpiece (11) of the claw clutch (9) is integral with a coupling part (13) of the over-detent clutch (12) and the clamping sleeve (19) is arranged on the driver sleeve (10) of the claw clutch (9).

3. A device according to claim 2 characterized further by the over-detent clutch (12) having as clutch parts two flange parts (13, 14) which are provided on their adjacent end sides with domes (25, 26) in which balls (15) engage in form-locked manner with one of the flange parts (13, 14) whereas the one flange part is arranged on the end of the counterpiece 11) of the claw clutch (9) which is opposite the mating claws (24).

4. A device according to claim 3 characterized further by the detent projection (20) having an inner bead which lies in ring form within a radial plane.

* * * * *